Nov. 29, 1938. H. W. GOULDTHORPE 2,138,656
POWER UNIT
Filed April 10, 1937 2 Sheets-Sheet 1

Inventor:
Hubert W. Gouldthorpe,
by Harry E. Dunham
His Attorney.

Nov. 29, 1938.    H. W. GOULDTHORPE    2,138,656
POWER UNIT
Filed April 10, 1937    2 Sheets-Sheet 2

Inventor:
Hubert W. Gouldthorpe,
by Harry E. Dunham
His Attorney.

Patented Nov. 29, 1938

2,138,656

UNITED STATES PATENT OFFICE 2,138,656

POWER UNIT

Hubert W. Gouldthorpe, Wesleyville, Pa., assignor to General Electric Company, a corporation of New York Application April 10, 1937, Serial No. 136,127

2 Claims. (Cl. 248—7)

My invention relates to power systems, and more particularly to an improved mounting arrangement for a power unit including an internal combustion engine and a generator directly coupled thereto.

An object of my invention is to provide an improved and simplified power unit and resilient mounting arrangement.

Further objects and advantages of my invention will become apparent and my invention will be better understood from the following description referring to the accompanying drawings, and the features of novelty which characterize my invention will be pointed out with particularity in the claims annexed to and forming part of this specification.

Figure 1:
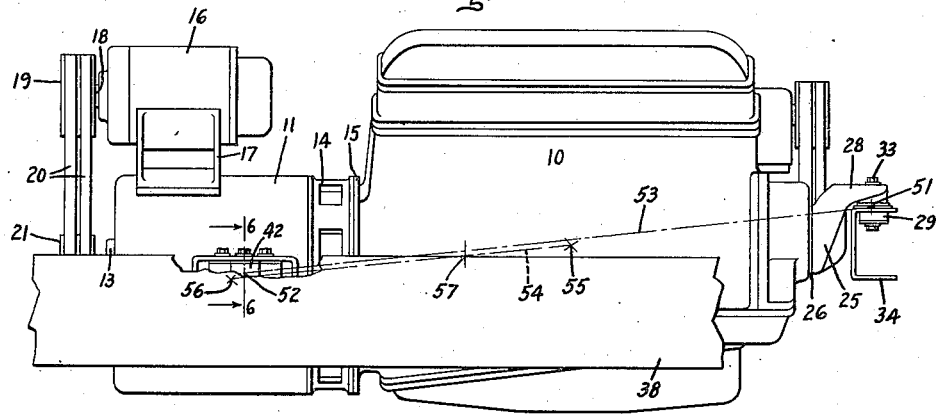
Figure 2:
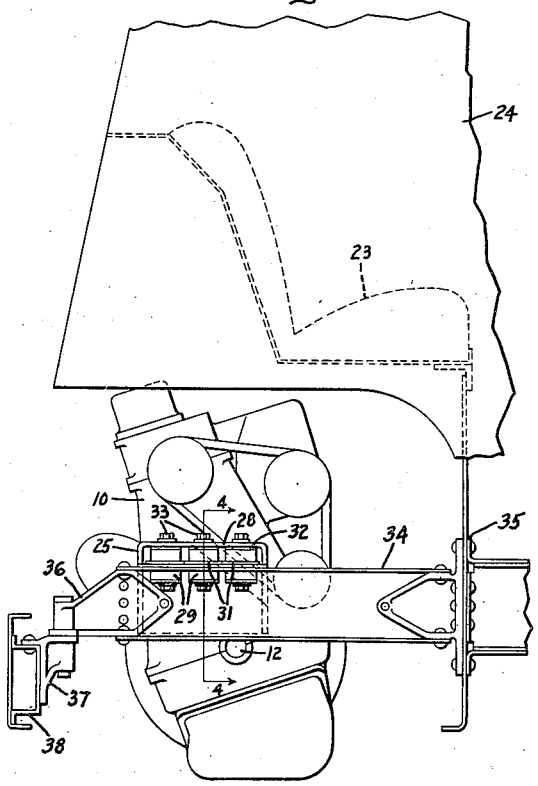
Figure 3:
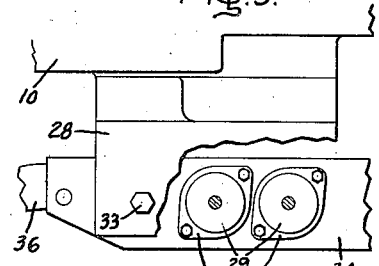
Figure 4:
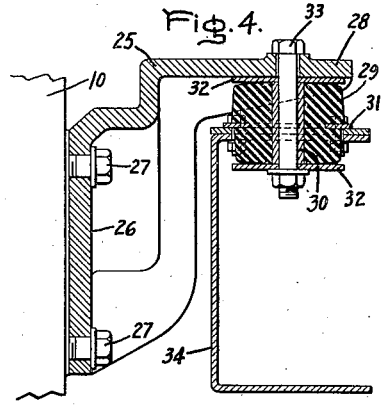
Figure 5:
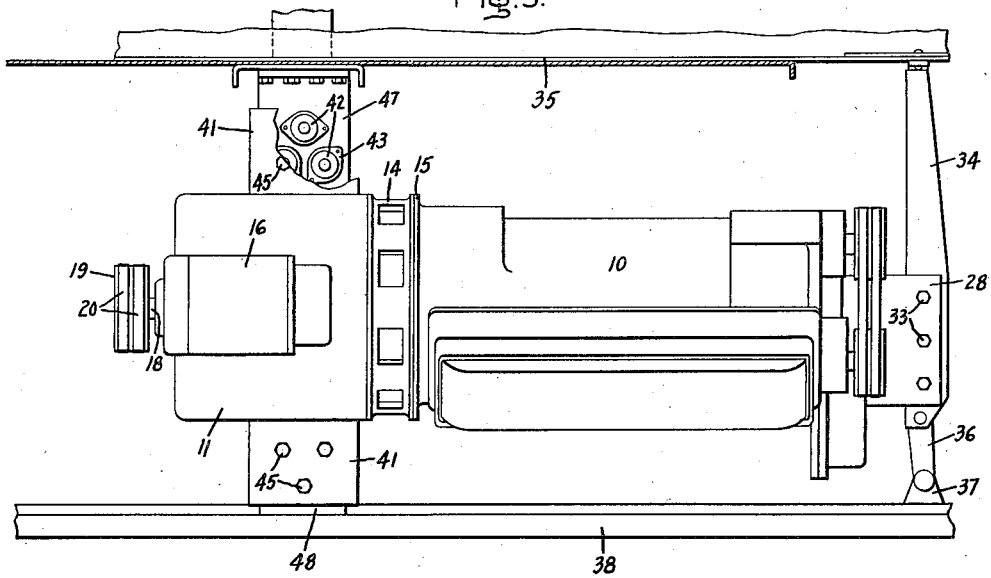
Figure 6:
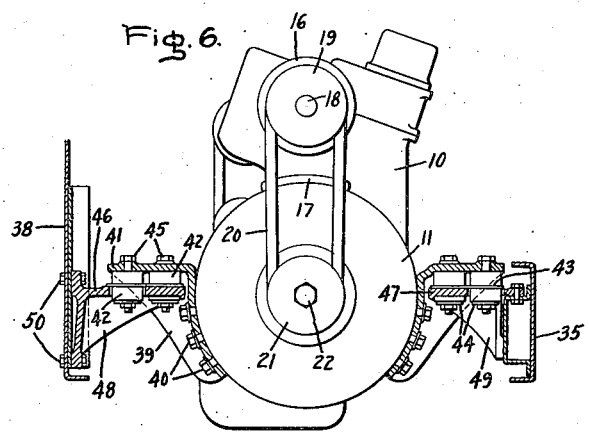

For a better understanding of my invention, reference is made to the accompanying drawings, wherein Fig. 1 illustrates an engine and an electric generator driven thereby and supported by my improved mounting arrangement; Fig. 2 is an end view of the power unit shown in Fig. 1 showing the resilient engine support; Fig. 3 is a plan view, partially broken away, of the engine support shown in Figs. 1 and 2; Fig. 4 is a sectional view taken along line 4—4 of the mounting arrangement shown in Fig. 2; Fig. 5 is a plan view, partially broken away, of the power unit shown in Fig. 1; and Fig. 6 is an end view of the power unit shown in Fig. 1 with a sectional view of the generator supports taken along line 6—6 in Fig. 1.

Referring to the drawings, I have shown an internal combustion engine 10 arranged to drive a generator having a stationary member 11 secured at one end to the engine, and a rotatable member directly supported by and coupled to the shaft 12 of the engine 10 at one end thereof, and supported at the other end by a bearing arranged in a hub 13 formed on the stationary member 11. In this arrangement, the generator requires no bearing for the rotatable member at the end adjacent the engine. The stationary member 11 of the generator is secured to a fan housing 14 which is rigidly secured to a flange 15 formed on the engine block 10. A battery charging generator 16 is supported by a mounting 17 on the stationary member 11 of the generator. The rotatable member of the battery charging generator 16 is mounted on a shaft 18, which is driven by a pulley 19 through belts 20 and a pulley 21 mounted on the end of the shaft 22 of the generator. With this arrangement, part of the weight of the generator armature is supported by the crank shaft through the coupling which connects the rotatable member of the generator to the engine drive shaft 12, and the rotational inertia of the generator armature is used to replace the conventional fly-wheel used with a conventional internal combustion engine. Furthermore, the full output of the engine 10 is utilized by the generator, and this makes the power unit a self-contained mechanical system with no net torque output. Such a power unit is especially desirable for driving passenger vehicles, as no torque arms are necessary, and there are no mechanical driving connections between the engine drive shaft and the chassis of the vehicle, as the power output is carried in the form of electrical power through flexible cables from the generator to the vehicle driving motors. In this manner, the engine vibration can be restricted entirely to the primary power system including the prime mover or engine and generator. A further desirable result is obtained by the rigid connection between the engine and the generator by the fact that the weight of the generator is added to the weight of the engine, and thereby increases the natural period of vibration of the unit, which tends to produce a smoother running power plant.

As shown in Fig. 2, this power unit can be readily mounted under a passenger seat 23 at the rear of a vehicle having a body 24. The power unit is arranged transversely of the vehicle, and the end of the engine opposite the end thereof which is rigidly secured to the stationary member of the generator is supported by a bracket 25 having a vertically extending flange 26 rigidly secured by screws 27 to the block of the engine 10. The supporting bracket 25 is provided with a horizontally extending flange 28 which is resiliently supported on three resilient cushions 29 of rubber or similar material. These cushions are vulcanized to a sleeve 30 and to transversely extending plates 31, and are secured between plates 32 and to the flange 28 by a bolt 33 which extends through the sleeve 30. The plates 31 rest upon a supporting frame formed by a channel section 34, which is secured at one end to the vehicle frame 35, and is supported by a bracket 36 at the other end. The bracket 36 is pivotally supported on another bracket 37 which is secured to the end frame 38 of the vehicle frame. A pair of supporting brackets 39 are secured by screws 40, arranged one on each of two diametrically opposite sides of the stationary member 11 of the generator, and longitudinally equidistant from an end of the generator, that is, in transverse alignment. These flanges also are arranged longitudinally of the generator in such a position with respect to the rigid connection between the fan housing 14 and the engine flange 15, and the weights of the various elements of the power unit, so that the distribution of the forces exerted upon this rigid connection will produce substantially only shear forces therein, and there is substantially no tendency for bending to occur at this joint between the engine and the generator. This position is determined in accordance with the principles of stresses in continuous beams, and a transverse plane through the approximate center 52 of the resilient supports 42 is shown to be nearer the rigid connection between the fan housing 14 and the flange 15 than the center of gravity 56 of the generator unit. The supporting brackets 39 are each provided with horizontally extending flanges 41 which are arranged to be resiliently supported on three resilient cushions 42 of rubber, or similar material. These resilient cushions are constructed similar to the rubber cushions supporting the front end of the engine, and are provided with horizontally extending supporting plates 43 vulcanized thereto intermediate the ends thereof. These cushions are secured between plates 44 to the flange 41 by bolts 45, and the supporting plates 43 engage horizontally extending flanges 46 and 47 formed on supporting brackets 48 and 49, respectively. The supporting bracket 48 is secured by bolts 50 to the end frame 38 of the vehicle frame and the supporting bracket 49 is secured to the vehicle cross frame member 35. As shown in Fig. 1, the center 51 of the engine resilient supports 29 and the approximate center 52 of the resilient generator supports 42 are located in substantially the same plane 53, and this plane is arranged substantially parallel to the principal mass axis 54 of the power unit. This principal mass axis is a hypothetical line which may be considered to extend between the center of gravity 55 of the engine 10 and the center of gravity 56 of the electrical generator unit, and passes through the resultant center of gravity 57 of the entire power unit. I found it desirable that the plane 53 of the centers of the resilient supports should pass through the resultant center of gravity 57 of the power unit, or as shown in Fig. 1, should be slightly above the center of gravity 57 and the principal mass axis 54 of the power unit. By arranging this plane 53 slightly above the principal mass axis 54, the stability of the system is increased, as the center of gravity of the power unit in such an arrangement is then below the plane of the resilient supports. The front end engine resilient support appears to be slightly to the left of the vertical center line in Fig. 2; however, the center of this support corresponds to the principal mass axis of the system, and the position shown is due to the fact that the engine block 10 is inclined to the vertical in this installation. This arrangement of the resilient supports also provides for maximum freedom of vibration torsionally about the axis of natural torsional vibration, and decreases the transmission of undesirable vibrations from the power unit to the vehicle.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A power unit including a prime mover and an electric generator driven thereby, said prime mover having a stationary member, said generator having a rotatable member and a stationary member, means for rigidly securing together said prime mover stationary member and said generator stationary member, and resilient means arranged adjacent the end of said prime mover stationary member opposite from said rigid securing means and on two diametrically opposite sides and longitudinally equidistant from an end of said generator stationary member in substantially the same plane for supporting said power unit and for providing a distribution of forces about said rigid securing means to produce substantially only shear forces thereon, said plane extending substantially parallel to the principal mass axis and substantially through the center of gravity of said power unit.

2. A power unit including a prime mover and an electric generator driven thereby, said prime mover having a stationary member, said generator having a rotatable member and a stationary member, means for rigidly securing together said prime mover stationary member and said generator stationary member, means including a resilient support arranged adjacent the end of said prime mover stationary member opposite from said rigid securing means for resiliently supporting said power unit, and means including a resilient support arranged on each of two diametrically opposite sides of said generator stationary member for resiliently supporting said power unit, the centers of all of said resilient supports being arranged in substantially the same plane parallel to and slightly above the principal mass axis of said power unit, said generator resilient supports being arranged longitudinally of said power unit with respect to said rigid securing means to provide a distribution of forces about said rigid securing means producing substantially only shear forces thereon.

HUBERT W. GOULDTHORPE.